United States Patent
Cato

(10) Patent No.: US 7,248,754 B2
(45) Date of Patent: Jul. 24, 2007

(54) APPARATUS AND METHOD FOR DETERMINING WHETHER MACHINE READABLE INFORMATION ON AN ITEM MATCHES THE ITEM

(75) Inventor: Robert Thomas Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 10/429,554

(22) Filed: May 5, 2003

(65) Prior Publication Data

US 2004/0223663 A1 Nov. 11, 2004

(51) Int. Cl.
*G06K 9/00* (2006.01)
*G06K 7/10* (2006.01)

(52) U.S. Cl. .................. 382/318; 235/462.01
(58) Field of Classification Search ............... 382/318, 382/216, 140; 235/426.01, 462.01
See application file for complete search history.

(56) References Cited

U.S. PATENT DOCUMENTS

| | | |
|---|---|---|
| 3,947,816 A | 3/1976 | Rabedeau |
| 4,654,872 A | 3/1987 | Hisano et al. |
| 4,713,532 A | 12/1987 | Knowles |
| 4,792,018 A | 12/1988 | Humble et al. |
| 4,964,053 A | 10/1990 | Humble |
| 4,982,438 A | 1/1991 | Usami et al. |
| 5,124,537 A | 6/1992 | Chandler et al. |
| 5,155,343 A | 10/1992 | Chandler et al. |
| 5,216,232 A | 6/1993 | Knowles et al. |
| 5,557,093 A | 9/1996 | Knowles et al. |
| 5,609,223 A | 3/1997 | Iizaka et al. |
| 5,635,697 A | 6/1997 | Shellhammer et al. |
| 5,635,699 A | 6/1997 | Cherry et al. |
| 5,637,852 A | 6/1997 | Knowles et al. |
| 5,638,461 A | 6/1997 | Fridge |
| 5,698,833 A | 12/1997 | Skinger |
| 5,952,642 A | 9/1999 | Lutz |
| 5,988,505 A | 11/1999 | Shellhammer |
| 6,098,885 A | 8/2000 | Knowles et al. |
| 6,123,262 A | 9/2000 | Shellhammer |
| 6,135,354 A | 10/2000 | Kuhon |
| 6,445,814 B2 | 9/2002 | Iijima et al. |

OTHER PUBLICATIONS

"Dual Laser Scanner for Enhancing Redability of Specuklarly Reflecting Labels," IBM Technical Disclosure Bulletin, May 1983, pp. 6721-6722.

*Primary Examiner*—Duy M. Dang
(74) *Attorney, Agent, or Firm*—Ronald V. Davidge

(57) ABSTRACT

A scanner, which reads machine readable information on an item and determines its location on the item, also includes one or more video cameras for determining dimensions of features on the item. A computer uses the machine readable information to find a record within a data structure. The record includes dimensions of one or more visible features of an item corresponding to the machine readable information and identified according to their location relative to the machine readable information. These dimensions of features are then compared to the dimensions of features of the item being scanned to determine whether the machine readable information read by the scanner matches the item being scanned.

12 Claims, 6 Drawing Sheets

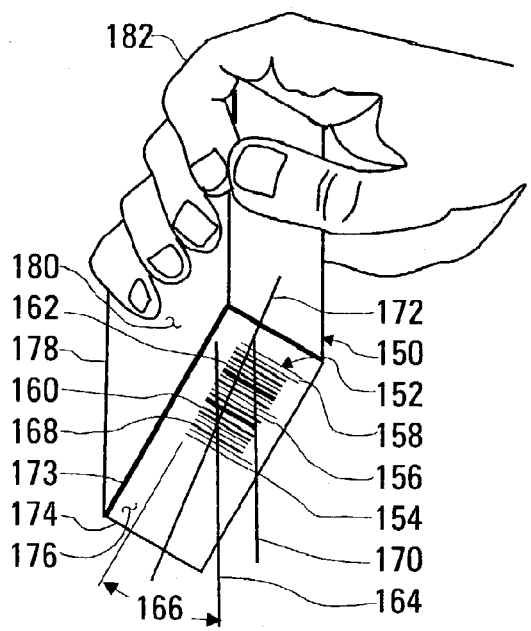
FIG. 4
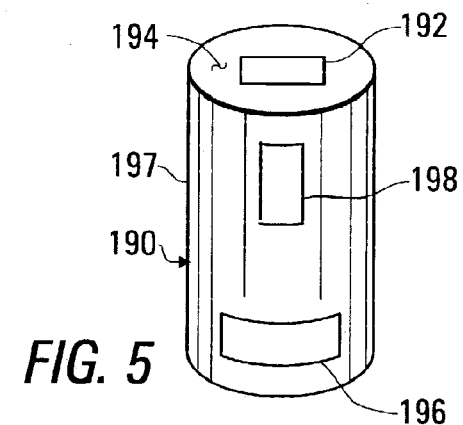
FIG. 5
| | 204 | 206 | 208 | 210 | 212 | 214 | 216 | 218 |
|---|---|---|---|---|---|---|---|---|
| 200 | CODE | MFG. | DESCRIPTION | PRICE | SHAPE | DIM1 | DIM2 | DIM3 |
| | 10725 | DMT | PEAS, 12 OZ | 0.98 | C | 4.5 | 5.0 | |
| 202 | 25371 | KGC | CEREAL, 16 OZ | 3.98 | R | 2.5 | 6.9 | 11.0 |
| | 63498 | NAF | VEG, 10 OZ | 1.75 | I | | | |
FIG. 6

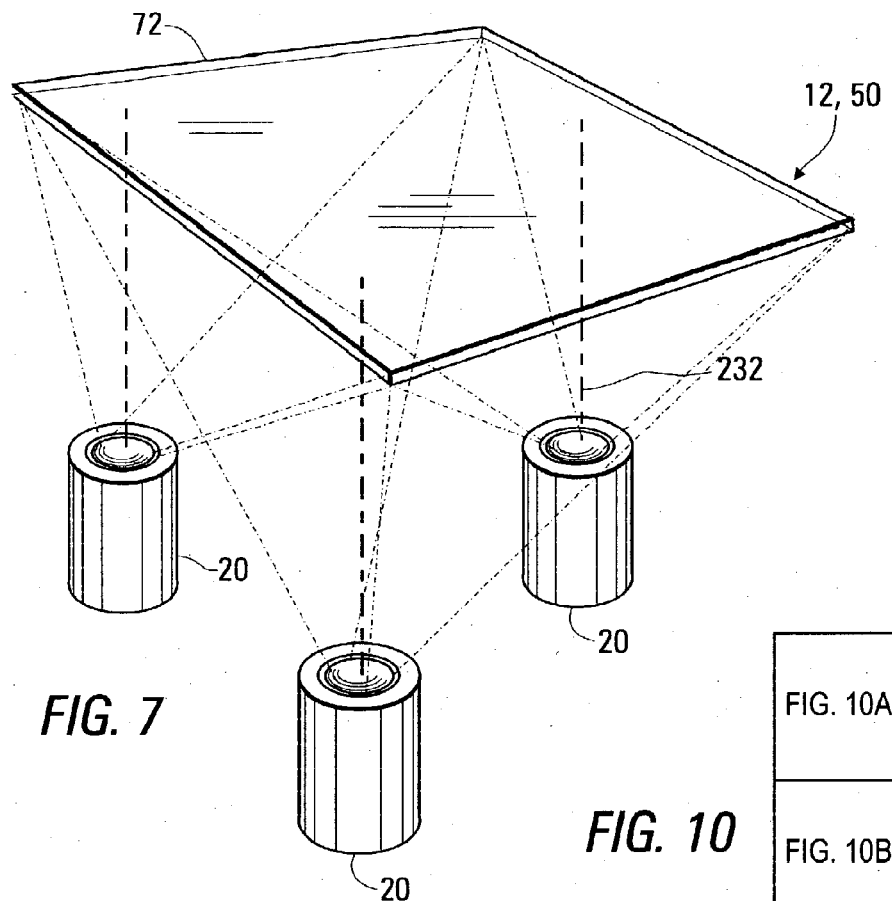
FIG. 7
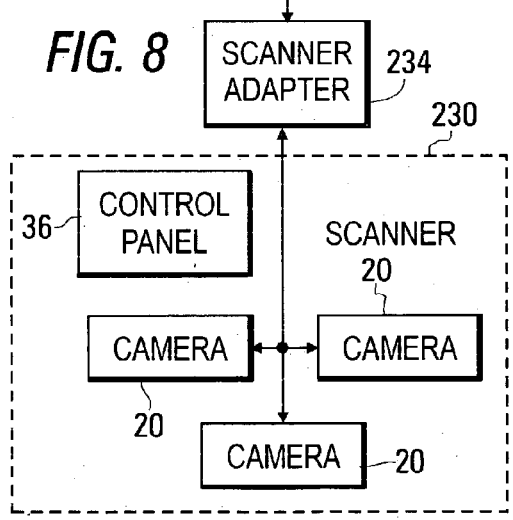
FIG. 8
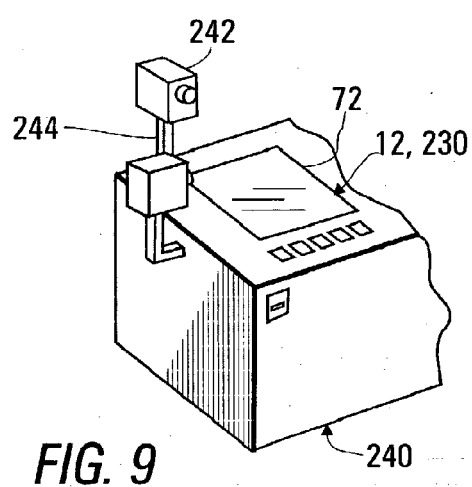
FIG. 9
| FIG. 10A |
|----------|
| FIG. 10B |
FIG. 10

APPARATUS AND METHOD FOR DETERMINING WHETHER MACHINE READABLE INFORMATION ON AN ITEM MATCHES THE ITEM

BACKGROUND OF THE INVENTION

1. Field of the Invention

This invention is related to reading and processing machine readable information on an item, and, more particularly, to a process for verifying the identity of the article by determining that machine readable information, such as a barcode pattern, read on an item matches the item.

2. Summary of the Background Art

The patent literature includes a number of descriptions of methods for a self-check-out process using a physical feature of an article being purchased to verify the identity of the article after machine readable information on the article has been scanned. Such a method is used to guard against attempts at deception, such as placing a barcode label from a less expensive item on the article being purchased or scanning one item before sending another item to be placed in a shopping bag.

For example, U.S. Pat. No. 4,792,018 describes such a system including a code reader for generating an output signal indicating a distinct code identifying an article, a conveyer for receiving and transporting the article, an entrance sentry for defining an inlet to a secured zone extending along a portion of the conveyer and for generating an output signal indicating the entry of the article into the secured zone and further indicating a measurable characteristic of the article, and a controller for moving the conveyer to accept or reject the article. The sentry may include a number of light beams forming a light curtain extending upward from the conveyer and across the conveyer at the inlet to the secure area, and a number of photocells receiving the individual light beams, with the number of beams broken by the movement of the article through the inlet indicating its height over the conveyer.

U.S. Pat. No. 5,609,223 describes another such system in which image obtaining means, such as a video camera looking downward on the article is placed near the light curtain. The article may be rejected based on physical features of the article included in the article image obtained by the image obtaining means. Alternatively, the height of the article may be measured by projecting a slit pattern of light at the top of the article, and by measuring the displacement, from the axis of the video camera lens, of the line at which the light strikes the top of the object. Along with the measurement of the height of the article, the position and shape of the article can be detected based on the two-dimensional image of the slit light as the article passes under the video camera. In another method, the height of the article is measured by evaluating the reflection of an ultrasonic wave directed downward toward the object.

What is needed is a reliable method for determining the orientation of the article when its height or other physical characteristic is measured. An article may differ greatly in its three dimensions, so that a measurement of a single dimension is not sufficient for identifying the article. Additionally, what is needed is a means for determining a dimension of an article as it is scanned, when the relationship between the machine readable information and the dimension is known.

The stationary barcode scanners typically used today for checking out articles being purchased are typically omnidirectional optical scanners in which a laser beam is deflected by a multifaceted spinning mirror and by a number of stationary mirrors disposed at various angles to form a number of scan lines projected through a window into a space adjacent the scanner. Within this space, the scan lines are laterally displaced from one another and are additionally disposed to extend at several different angles, in an arrangement making the placement and orientation of the barcode being scanned non-critical, so that many different types of articles can be scanned quickly and easily. Descriptions of such omnidirectional optical scanners found, for example in U.S. Pat. Nos. 3,947,816, 4,713,532, 5,216,232, 5,557,093, 5,637,852, and 6,098,885.

What is needed is a method for determining which of the various scan lines from the omnidirectional scanner is successfully used to read machine readable information and for subsequently determining a range of possible locations for the barcode and for other visible features on the article being scanned as it is scanned.

A number of other patents describe apparatus and methods for reading machine readable informations from the output of a video camera. For example, U.S. Pat. No. 5,155,343 describes a bar code reader including an optical system for storing in memory a two-dimensional image containing a bar code symbol. The location of the bar code image is detected by computing the accumulated sum of the products of the derivatives of respective first and second scan lines as a location score for the image under consideration. The higher the location score, the higher the probability that the area under consideration contains a bar code image. Also, a method and apparatus is disclosed for determining the fine orientation of a located bar code image by the crosscorrelation of interpolated scan line data. The bar code image is filtered by shifting interpolated scan line data in accordance with the detected peak of the cross-correlation and combining the shifted scan line data.

U.S. Pat. No. 5,155,343 describes an omnidirectional bar code reader using a virtual scan of raster scan digital image memory to create the equivalent scanning pattern of a mechanical laser scanner. A two dimensional image of bar code symbol at any random orientation is captured in a memory. In one embodiment, the image memory is scanned to create a virtual scan equivalent to the scan pattern of a laser scanner. In another embodiment, the image memory is divided into plurality of memory segments, and simultaneous virtual scan is provided in each of the respective memory segments. In yet another embodiment, the memory is divided into a plurality of overlapping memory segments and simultaneous virtual scan is provided in each of the respective overlapping memory segments. The overlap between the memory segments is made large enough so that a bar code symbol of the expected size will be entirely included in one or the other of the overlapping memory segments. Thus, the boundary problem between memory segments is resolved and it is not necessary to concatenate partial scans between adjacent memory segments. The segmented scan may be achieved using an interleaved memory storage arrangement.

U.S. Pat. No. 6,135,354 describes a barcode image processing system which processes video signals including video data representing images of barcode labels to be decoded and verified. A video signal containing video data representative of successive images of a plurality of barcode labels is processed to extract the video data and the horizontal and vertical synchronization signals from the video signal. A digitalization circuit is provided which digitalizes the video signal over a varied threshold voltage. The range or deviation of the threshold voltage which yields decodable video data is used as a measure of a quality of a barcode label. A gate trigger signal is generated which is synchronized to the vertical synchronization signal and which controls when a barcode decoder decodes video data for a horizontal line taken from a barcode image. A masking circuit is provided to mask out portions of a video field except for a portion sufficient to contain one barcode label, which is useful in the situation where barcode labels are printed very close together.

U.S. Pat. No. 6,698,833 describes a system including omnidirectional barcode locator that processes, in realtime, a digital video signal defining a pixelized image of a conveyor carrying parcels through the field of view of a CCD camera. The omnidirectional barcode locator divides the video image into a plurality of cells and produces two output signals, a cell barcode indication signal and a cell barcode orientation signal, for each cell. A host computer responds to a "true" cell barcode indication signal for a cell by storing the portion of the video image corresponding to the cell in a mass storage memory. 7be host computer also stores a representation of the cell barcode orientation signal for each cell in which the cell barcode indication signal is "true." The omnidirectional barcode locator thus allows the host computer to store only those cells of the video image that contain barcode data. The barcode data may then be provided to a barcode reader for further processing.

Other patents describe the use of images from multiple video cameras to determine the location of features of an object in three-dimensional space. For example, U.S. Pat. No. 4,654,872 describes a system for recognizing a three-dimensional object includes a plurality of image pickup apparatus, e.g. television cameras, by which images of the object are picked up from at least three directions. Feature points are extracted from each of at least three images obtained. Two sets of feature points on epipolar lines are formed, with the lines being formed on at least two of the images by a feature point on another image. A set of feature points is selected to satisfy a restricting condition determined by the relationship of the image pickingup direction.

U.S. Pat. No. 6,445,814 describes three-dimensional information processing apparatus for obtaining three-dimensional information from an object having a three-dimensional shape, and performing predetermined information processing, comprises: a camera for sensing images of the object from a plurality of coordinate positions using an image sensing system having one or a plurality of optical systems. A plurality of depth information are extracted from image sensing related information sensed by the camera at the plurality of coordinate positions, and the plurality of extracted depth information are converted and unified into depth information expressed by a unified coordinate system.

What is needed is a way to read a barcode to identify an item from a video image of the item, and to then use the video image, with one or more additional video images, to determine the positions of additional features of the item, with the location of the barcode on the video images being further used to determine whether the locations of additional features match a permissible range of such locations for the item identified by the barcode.

SUMMARY OF THE INVENTION

In accordance with a first aspect of the invention, a method is provided for determining whether machine readable information on an item being scanned corresponds to the item being scanned. The method includes a first step of reading the machine readable information to determine a value represented by the machine readable information. The method includes a second step of reading data from a data structure. The data from the data structure includes a dimension of a first visible feature of a listed item corresponding to the value represented by the machine readable information. The first visible feature has a first relationship with a location of the machine readable information on the item corresponding to the value represented by the machine readable information. The method additionally includes a third step of determining a dimension of a first visible feature of the item being scanned. The first visible feature has the first relationship with a location of the machine readable information on the item being scanned. The method further includes a fourth step of comparing the dimension of the first visible feature of the item being scanned with the dimension of the first visible feature of the item corresponding to the value represented by the machine readable information.

The data from the data structure may include a first plurality of expected dimensions of visible features of the listed item, with each of the visible features of the listed item having an expected relationship with the location of the machine readable information on the listed item. The third step then includes determining a second plurality of dimensions of visible features of the item being scanned, with each of the visible feature of the item being scanned having a measured relationship with the location of the machine readable information on the item being scanned. Each of these measured relationships is identical to an expected relationship of a corresponding visible feature of the listed item. The fourth step then includes comparing each measured dimension in the second plurality with a corresponding expected dimension in the first plurality.

For example, if the value represented by the machine readable information corresponds to an item formed as a box having rectangular sides, the first visible feature of the item corresponding to the value is an edge having a parallel relationship with an edge of the barcode, the second visible feature is an edge of the item having a perpendicular relationship with the edge of the barcode, and the third visible feature is an edge having a relationship with the barcode of extending away from the surface of the item on which the barcode is printed.

In accordance with a first embodiment of the invention, the machine readable information is read from an output signal of a photodetector receiving a reflection of a laser beam as the reflection is moved across the item being scanned in a plurality of scanning movements occurring in a repeatable pattern, and a location of the machine readable information on the item being scanned is determined by determining which of the scanning movements occurs as the machine readable information is read.

A second visible feature of the listed item may additionally have a relationship with an orientation of the machine readable information, with a visible feature of the item being scanned corresponding to the second visible feature additionally having the relationship with an orientation of the machine readable information of the item being scanned. For example, the second visible feature may be a distance from the end of the machine readable information and an edge of the item.

In accordance with a second embodiment of the invention, video data is generated from output signals of a plurality of video cameras viewing the object being scanned, the output pattern is read from the video data, a location of the machine readable information on the item being scanned is determined from the video data, and a dimension of the first visible feature of the item being scanned is determined from the video data.

BRIEF DESCRIPTION OF THE FIGURES

FIG. 4 is a perspective drawing, as viewed from below, of an item being held above the scanner of FIG. 2 for scanning a barcode label;

FIG. 5 is a perspective view of a cylindrical item, showing alternative positions for placement of machine readable information;

FIG. 6 is a pictographic view of a data structure stored within a hard drive of a computer in the checkout station of FIG. 1;

FIG. 7 is a perspective view of major internal components of a scanner within the checkout station of FIG. 1, built in accordance with a second embodiment of the invention;

FIG. 8 is a block diagram of the scanner of FIG. 7;

FIG. 9 is a fragmentary perspective view of a checkout station, showing alternate camera positions for use in the present invention.

DETAILED DESCRIPTION OF THE INVENTION

Figure 1:
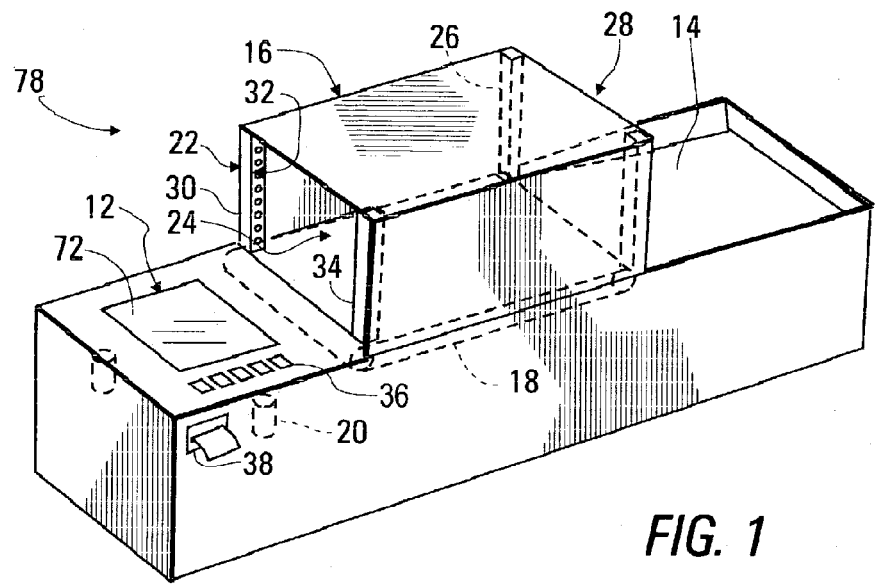
FIG. 1 is a perspective view of a checkout station built in accordance with the invention.

FIG. 1 is a perspective view of a checkout station 10, built in accordance with the invention, for use by a customer to check out purchased items. The checkout station 10 includes a scanner 12 for scanning machine readable information, such as machine readable informations on the items being purchased, a collection area 14, in which purchased items are placed in bags, and a secure zone 16, through which scanned items are transported by a conveyor 18 between the scanner 12 and the collection area 14.

The scanner 12 includes one or more video cameras 20 facing upward to view an item being scanned as the machine readable information is read. The video cameras 20 provide data used to determine the location and dimension of one or more visible features of the item being scanned, in addition to the machine readable information. These visible features, which may include length of one or more of the sides of the item being scanned, are identified according to their location relative to the location or location and orientation of the machine readable information. The data obtained in reading the machine readable information is used to identify the item being scanned, and the visible features are compared with data providing a range of permissible locations or values of the visible for items of the type identified. If these locations or features fall within such ranges, the item is accepted for transport through the secure area 16 by the conveyor 18.

The secure area 16 includes an entrance detector 22 at an entrance opening 24 and an exit detector 26 at an exit opening 28. Each of these detectors 22, 26 has a light bar 30 with a number of light sources 32, such as light-emitting-diodes (LEDs), and a sensor bar 34 including a similar number of photodetectors (not shown). The individual light sources 32 are directed at the individual detectors, so that a item being inserted between the light bar 30 and the sensor bar 34 breaks the path of light to one or more of the photodetectors, providing an indication of the presence of the item, together with its height over the conveyer.

After an item is accepted by measurements made in the scanner 12, the conveyor belt 18 is turned on in response to a determination by the entrance detector 22 that the item has been inserted into the secure area 16. The conveyor belt is then turned off following a determination by the exit detector 26 that the item has moved outward from the secure area 16. The entrance detector 22 may also be used to prevent the transport of a second, unscanned item through the secure area 16, with the conveyor belt 18 being stopped and reversed if an attempt is made to do so.

The checkout station 10 also includes a control panel 36 having a number of buttons and indicators, such as an illuminated green indicator turned on when a scanned article has been accepted and an illuminated red indicator turned on when an article has been rejected. The checkout station 10 further includes a receipt printer 38 printing a receipt for the items scanned when the checkout process has been completed. The checkout station 10 may additionally include other features as described in U.S. Pat. No. 4,792,018, the disclosure of which is incorporated herein by reference.

Figure 2:
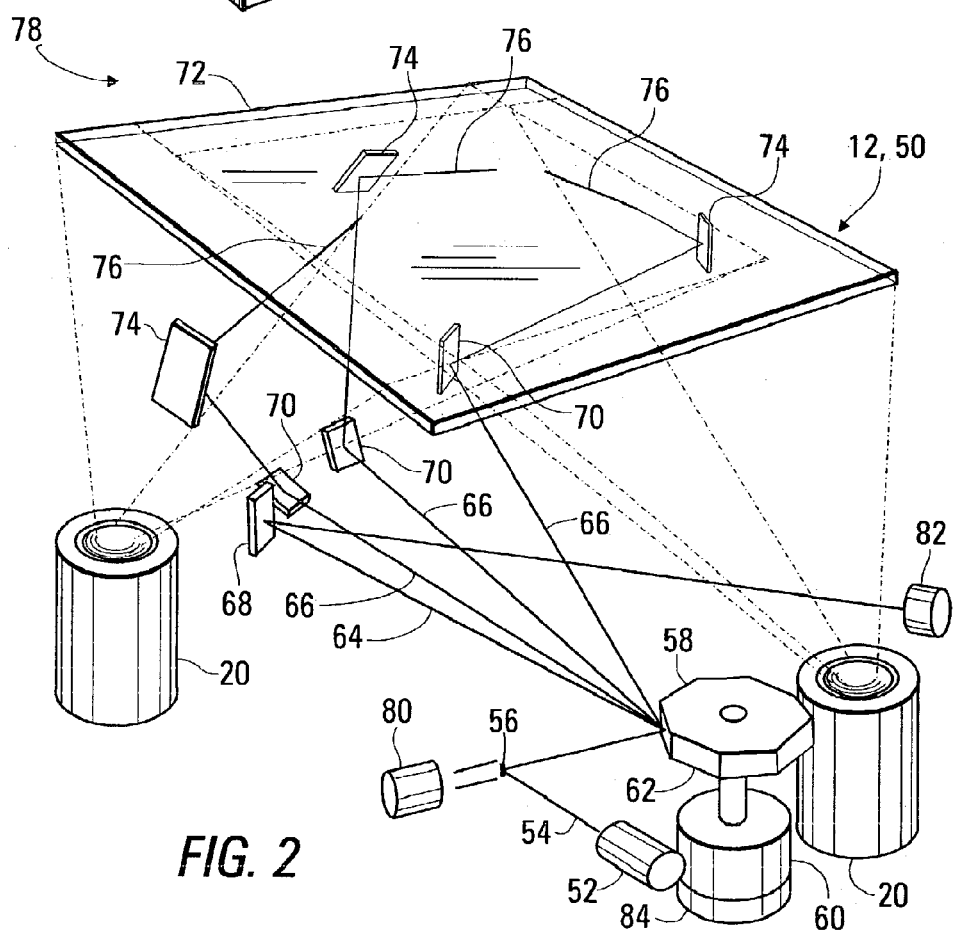
FIG. 2 is a perspective view of major internal components of a scanner within the checkout station of FIG. 1, built in accordance with a first embodiment of the invention.

FIG. 2 is a perspective view of major components within a version 50 of the scanner 12 built in accordance with a first embodiment of the invention. This scanner version 50 includes a laser 52 producing a beam 54 directed by a small mirror 56 toward a spinning multifaceted mirror 58, rotationally driven by a motor 60. The individual facets 62 of the spinning mirror 58 are individually angled to produce a number of reflections 64, 66 of the laser beam 54, with these reflections moving in repeatable scanning motions while being angularly displaced from one another to strike individual mirrors 68, 70, with the reflections from mirrors 70 being toward the window 72 of the scanner 50 by additional mirrors 74. The scanning rays 76 directed through the window 72 extend into a region 78 above the window 72 from various sides, at various angles, with scanning movements in various directions, in order to read machine readable information as an item is held at various angles within the region 78. The reflected rays 66 and the associated stationary mirrors 70, 74 are representative of a greater number of rays and mirrors used to scan machine readable information in a number of positions and orientations.

A reflection of the object being scanned is returned along the path of rays directed to strike the object, being reflected by the stationary mirrors 70, 74 and by the spinning mirror 58 to the small mirror 56. A portion of this reflection is then transmitted around the small mirror 56 to an output photodetector 80. Since the object being scanned is at least partly diffuse, the reflection being returned to the photodetector 80 is much larger in diameter than the beam 54 directed at the small mirror from the laser 53, so that a substantial portion of this returning reflection is transmitted around the small mirror 56. The photodetector 90 may include a collecting lens directing this relatively large reflected beam toward a relatively small photosensitive element. The output signal from the photodetector 80 is used to read the encoded information of the machine readable information.

Alternately, the spinning mirror 58 may be replaced by a disk including a number of holograms similarly deflecting a laser beam.

In accordance with the invention, information is developed to identify each of the scanning rays 76, so that it can be determined which scanning ray 76 is successful in reading all or a portion of the machine readable information. This information is then used to determine the approximate position and orientation of the machine readable information.

In the example of FIG. 2, a first reflection pattern 64 is directed to a timing photodetector 82, by reflection off a stationary mirror 68, with the output signal of the timing photodetector 82 then being used to provide a signal indicating the start of a sequence of scans. Since these scans are then repeatable and predictable with continued movement of the spinning mirror 58, a count of output pulses from an emitter 84, also driven by the motor 60, is then used to determine which scan is occurring when all or part of machine readable information is properly read.

Alternately, the emitter 84 may be replaced by an encoder, producing a number of encoded pulse patterns with rotation of the motor 60, with these patterns being used to determine the position of the spinning mirror 58. This type of output thus eliminates a need for the timing photodetector 82.

Figure 3:
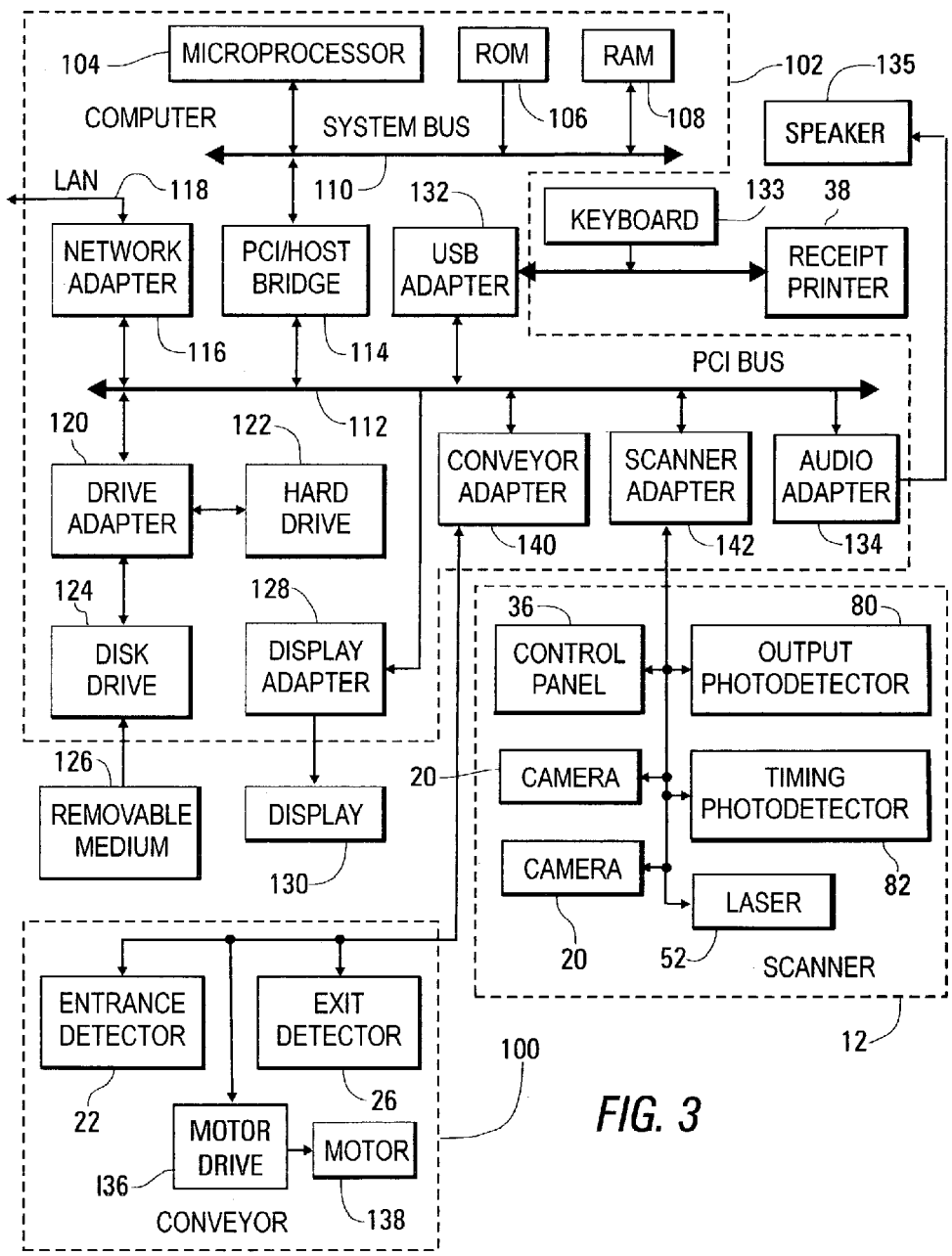
FIG. 3 is a block diagram of the checkout station of FIG. 1, configured in accordance with the first embodiment of the invention.

FIG. 3 is a block diagram of the checkout station 10, configured in accordance with the first embodiment of the invention to include the scanner 12, a conveyor subsystem 100, and a computer 102. The computer 102 may be installed on a shelf (not shown) within the checkout station 10, or it may be placed at another location, being connected by signal cables to various components within the checkout station 10.

The computer 102 includes a microprocessor 104 connected to ROM 106 (read only memory) and to RAM 108 (random access memory) by means of an system bus 110, which is additionally connected to an auxiliary bus 112, such as a PCI (Peripheral Component Interconnect) bus, through a bridge circuit 114. A number of adapters are connected to the auxiliary bus 112, with a network adapter 116 providing for a connection to a LAN 118 (local area network) and with a drive adapter 120 being connected to a hard drive 122 and to a disk drive 124, reading data from a removable medium 126. For example, the disk drive 124 is a diskette drive, while the removable medium 126 is a 3.5-inch floppy diskette. Alternately, the disk drive 124 may be an optical drive, while the removable medium 126 is a CD or DVD. A display adapter 128 is connected to a display 130, which may be an LCD or CRT device. A USB adapter 132 provides additional connections for external devices, such as a keyboard 133 and the receipt printer 38. An audio adapter 134 drives an external speaker 135, which is used, for example, to provide instructions for the customer using the scanner 12.

The conveyor subassembly 100 includes the entrance detector 22 and the exit detector 26, placed at opposite ends of the secure area 16, which are constructed as described above in reference to FIG. 1. The conveyor subassembly 100 additionally includes a motor drive circuit 136, which is used to drive a motor 138, starting and stopping the conveyor 18 and driving the conveyer 18 in either direction. These elements are connected to the auxiliary bus 112 through a conveyor adapter 140.

The scanner 12 includes the output photodetector 80, the timing photodetector 82, the emitter 84, the video cameras 20, the control panel 35, and the laser 52, all of which have been described above in reference to FIGS. 1 and 2. These elements are connected to the auxiliary bus 112 by means of a scanner adapter 142. Preferably, the laser 52 is switched on for use only as needed during the process of scanning machine readable information.

Within the computer 102, data and instructions for programs are typically stored within the hard drive 122, being loaded into RAM 108 for execution within the microprocessor 104. Data and instructions for programs to be executed within the microprocessor 104 are read into from the removable medium 126, which is a computer readable medium, within the disk drive 124, being stored in the hard drive 122, which is also understood to be a computer readable medium. Alternately, data and instructions for programs to be executed within the microprocessor 104 may be transmitted over the LAN 118 in the form of a computer data signal embodied in a carrier wave, to be received through the network adapter 116 for storage in the hard drive 122. Data and program instructions can also be read from the ROM 106, which is another computer readable medium.

Various functions may alternately be distributed among several processors, with processors in peripheral hardware, such as the scanner 12 performing certain functions.

FIG. 4 is a perspective view from below of an item 150 being held over the window 72 of the scanner 12 for scanning machine readable information 152.

The machine readable information 152 is, for example, a UPC (Unified Product Code) pattern, having a beginning line segments 154, central line segments 156, and ending line segments 158. A first segment of an encoded number is included in a first portion 160 of the machine readable information 152, extending between the beginning line segment 154 and the central line segment 156, while a second segment of the encoded number is included in a second portion 162, extending between the central line segment 156 and the ending line segment 158.

The machine readable information 152 is wide enough to allow the each of the segments to be read by a scan line 164, formed by a moving laser beam, to read one of the portions 160, 162 as it crosses this portion 160, 162 at an angle 166 within 45 degrees of lateral edge 168 of the machine readable information 152. In the example of FIG. 4, the first portion 160 of the machine readable information 152 is read by the scan line 164, while the second portion 166 thereof is read by the scan line 170. Alternately, a scan line 172 crossing the machine readable information 152 at a lower angle with respect to the lateral edge 168, is used to read both portion 160, 162 of the machine readable information 152.

Each of the portions 160, 162 can be read backward or forward. In each of the scan lines 164, 170, 172, the direction of movement of the laser beam is always the same, so the condition of reading the barcode portions 160, 162 forward or backward is used, along with the knowledge of which scan line correctly read one of these portions, to determine information regarding the location and orientation of the machine readable information 152.

The use of a pair of video cameras having optical axes extending parallel to one another but spaced apart from one another to determine the position of features on an object in all three dimensions, with the object viewed by both cameras, is well known. For example, various techniques for using two or more video cameras for determining locations of features in three dimensions are discussed in U.S. Pat. Nos. 4,654,872, 4,982,438, 5,638,461, and 6,445,814, the disclosure of each of which is incorporated herein by reference. Thus, output signals from the two cameras 20 are used to determine the locations of various features of the item 150. In the example of FIG. 4, the length of a first edge 173 and of a second edge 174 of the surface 176 on which the machine readable information may be determined from the locations in three dimensions of the corners of this surface 176. The length of the edges 178 of surface 180 cannot be determined because of the position of the hand 182 holding the item 160.

FIG. 5 is a perspective view of a cylindrical item 190, showing alternative positions for placement of machine readable information. The machine readable information may be placed in a position 192 extending along an end 194 of the item 190, in a position 196 extending partly around the curved surface 197 of the item 190, or in a position 198 extending along the length of the item 190.

FIG. 6 is a pictographic view of a data structure 200, stored within the hard drive 122 (shown in FIG. 3) in accordance with a preferred version of the invention. Alternatively, the data structure 200 may be stored elsewhere, such as in a database accessible to the checkout station 10 and to additional checkout stations over the LAN 118. This data structure 200 preferably includes a record 202 for each type of item having machine readable information to be processed through the checkout station 10. Each of the records 202 includes a code field 204, identifying the item by an alphanumeric code permitting the record 202 to be accessed when the barcode label 152 of the item is scanned. Each of the records 202 also includes information to be used in preparing the receipt in a manufacturer field 206, a description field 208, and a price field 210.

To provide for the features of the invention, each record 202 also includes a shape field 212 and a number of dimension fields. The shape field includes a code indicating the shape of an item. For example, the letter "R" indicates a box in which each side is rectangular, the letter "C" indicates a cylindrical item, and the letter "I" indicates an irregular item in which the dimensions may vary greatly from one example of the item to another, so that the measuring features of the invention cannot be used effectively.

Referring to FIGS. 4 and 6, in a record 202 corresponding to a rectangular box, the first dimensional field 214 and the second dimensional field 216 represent the lengths of the edges of the surface 176 on which the machine readable information 152 is printed. The number stored in the first dimensional field 214 represents the length of an edge 173 extending parallel to an edge 168 of the machine readable information 152, while the number stored in the second dimensional field 216 represents the length of an edge 174 extending perpendicular to this edge 168 of the machine readable information 152. The third dimensional field 218 stores a number representing the length of an edge 178 extending away from the surface 176 on which the machine readable information 152 is printed.

Referring to FIGS. 5 and 6, in a record 202 corresponding to a cylindrical item 190, if the machine readable information is in the position 192, extending along an end 194 of the item 190, and additionally if the machine readable information is in the position 198, extending partly around the curved surface 197 of the item 190, the first dimensional field 214 represents the diameter of the item, while the second dimensional field 216 represents the length of the item 190. If the machine readable information is in the position 196, extending along the length of the curved surface 190, the first dimensional field 214 represents the length of the item 190, while the second dimensional field 216 represents the diameter of the item 190.

In general, some but not all of the features to be evaluated are visible to the cameras 20. In the example of FIG. 4, the edges corresponding to data stored within the first dimensional field 214 and in the second dimensional field 216 are visible, while the edges corresponding to data stored in the third dimensional field 218 are not visible, being totally or partly covered by the hand 182 holding the item 150. Thus, when a comparison is made between features measured during the process of scanning an item and the data stored within the data structure 200, only the features that can be measured are preferably used during an evaluation to determine whether the item being scanned matches the item for which stored data is available.

In general, each record 202 within a number of records in the data structure 200 includes a shape field 212 storing a data determining an order of the listing of dimensions for visible features within the dimension fields 214, 216, 218, with this order being defined in terms of the relationships between the visible features and the location of the barcode on the item corresponding to the record 202.

Allowable values for deviations from the values listed in the dimensional fields 214, 216, 218 may be stored in additional fields (now shown) in the data structure 200, or such values for deviations may be uniformly applied or calculated according to an algorithm.

While the above discussion has described the application of the invention to measure rectangular boxes and cylindrical items, it is understood that the invention can additionally be applied to other known shapes. It is further understood that there may be items that vary too much, or that are too large, for example, to which these methods cannot readily be applied. Such items, which are indicated, for example, by a "I" in the shape field 212, may be accepted without dimensional checking, or an employee of the organization in which the checkout station 12 is placed may be summoned for verification, for example by a synthesized message broadcast through the speaker 135 (shown in FIG. 3).

While the above discussion has described the application of the invention to the measurement of edge dimensions, it is understood that other visible features of the items being scanned may alternately be used.

FIG. 7 is a perspective view of major internal components of a version 230, built in accordance with a second embodiment of the invention; of the scanner 12 within the checkout station of FIG. 1. In this scanner version 230, three video cameras 20 are used to locate and read the machine readable information on an item being scanned, as well as to determine the values of dimensions being checked to verify that the proper article is being scanned. Preferably, the video cameras 20 are spaced apart with their optical axes 232 each extending perpendicularly to the scanner window 72, and with the field of view of each of the cameras 20 covering all of the window 230. Thus, in the scanner version 230 the laser 52, photodetectors 80 and 82, and associated mirrors 68, 70, 74 of the scanner 50, described above in reference to FIG. 2, are eliminated, while a third camera 20 is added to ensure that machine readable information directed toward the window 72 will be fully seen by at least one camera 20.

Methods for recognizing and reading machine readable informations from data derived from the output signals of video cameras are known to those skilled in the art, being described, for example, in U.S. Pat. Nos. 5,124,537, 5,155, 343, 5,698,833, and 6,135,354, the disclosure of each of which is incorporated herein by reference.

FIG. 8 is a block diagram of the scanner version 230 of FIG. 7, together with a scanner adapter 234 configured to process input signals from three video cameras 20. This scanner adapter 234 is connected to the auxiliary bus 112 of the computer 102, described above in reference to FIG. 3, in a manner similar to the connection of scanner adapter 142.

FIG. 9 is a fragmentary perspective view of a checkout station 240, showing alternate camera positions for use in the present invention. With either the first or second embodiment of the invention, one or more of the cameras 20 may be replaced with a video camera 242 mounted outwardly from the scanner window 72 and above this window 72 by means of a bracket 244. Alternatively, one or more of the video cameras 242 may be added to the cameras 20. One or more cameras 242 may be mounted inside or outside the secure area 16 (shown in FIG. 1) to read a barcode label and additionally to view one or more visible features of an item passing through the secure area 16.

Figure 10A:
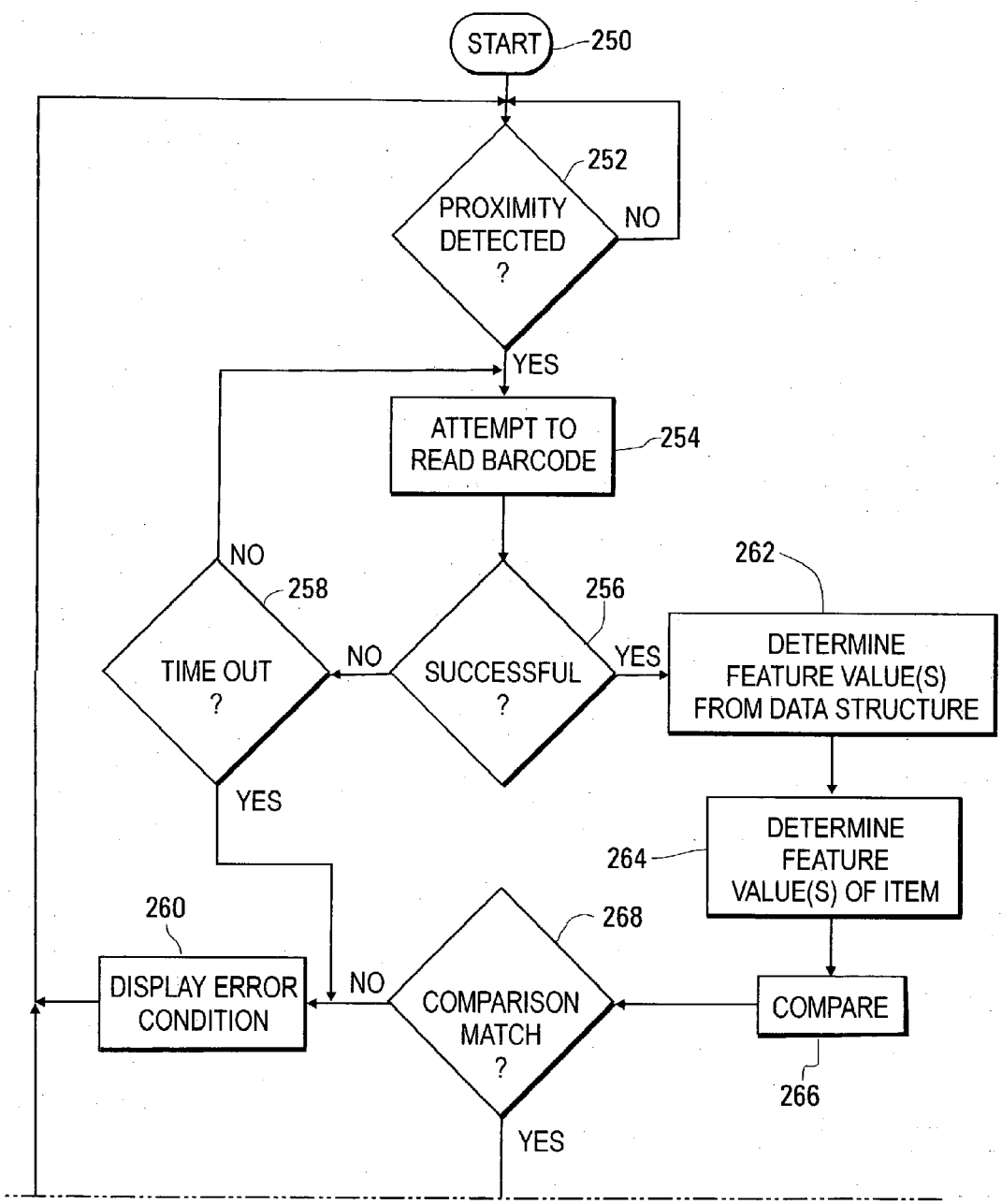
FIG. 10 is a flow chart of processes occurring within the checkout station of FIG. 1, being divided into an upper portion, indicated as FIG. 10A, and a lower portion, indicated as FIG. 1B.
Figure 10B:
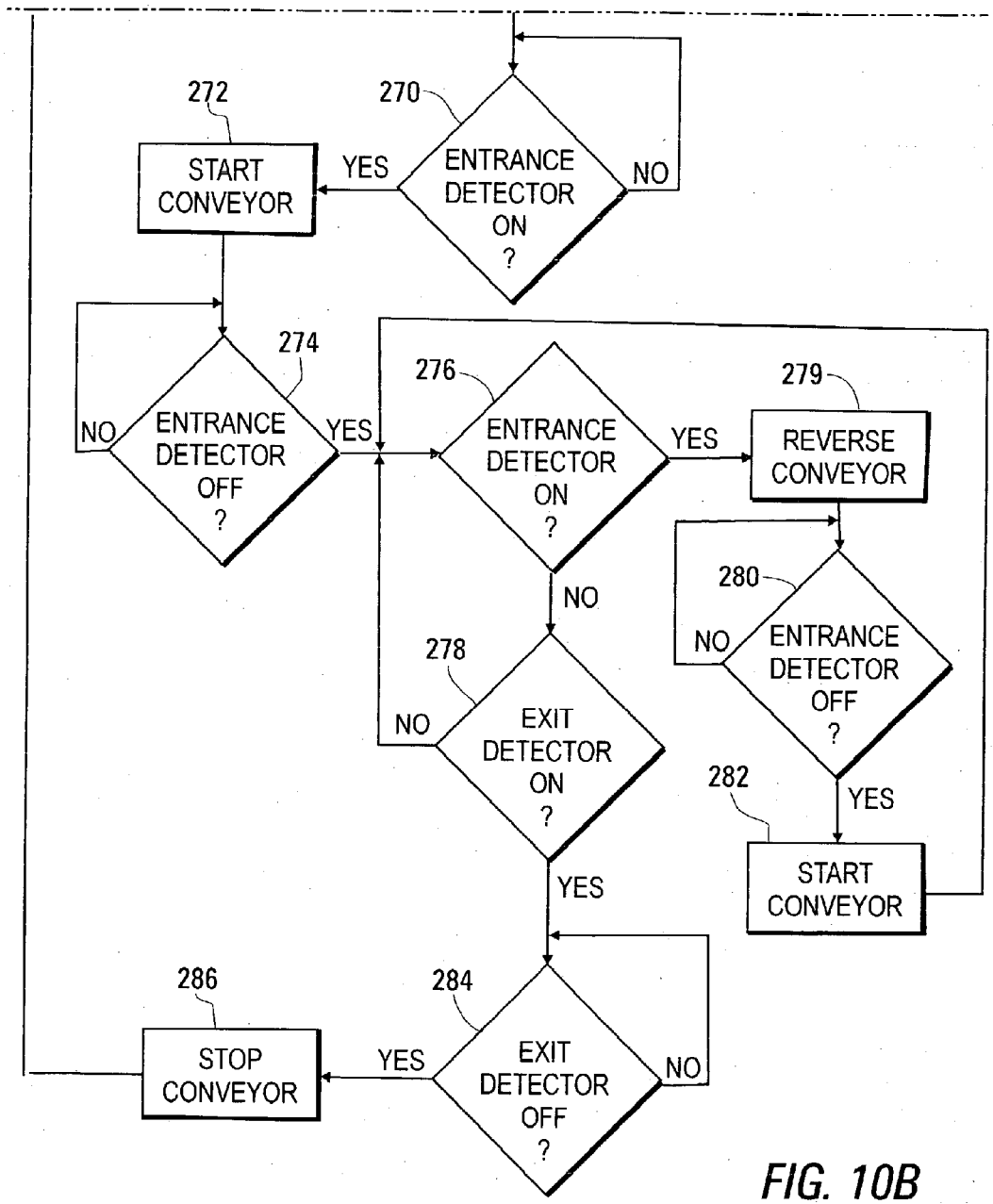

FIG. 10 is a flow chart of processes occurring within the checkout station of FIG. 1, with the flow chart being divided into an upper portion, indicated as FIG. 10A, and a lower portion, indicated as FIG. 1B. The processes of FIG. 10 are controlled by a program executing within the microprocessor 104 of the computer 102, with the program starting in step 250 after initialization of the computer 102 is completed.

After the program is started, the system proceeds to step 252 to wait for proximity detection, in order to detect an attempt to scan the machine readable information of an item by bringing the item into place above the window 72 of the scanner 12. If the scanner 12 includes one or more video cameras 20 facing upward, as shown in FIGS. 2 and 7, proximity detection is preferably carried out by monitoring the output signal from one or more such cameras, with the camera being configured and aimed so that a change in its output signal indicates that an item has been brought into the area 78 above the window 72. Otherwise, proximity detection may be accomplished by another manner known to those skilled in the art. When proximity detection occurs, the system proceeds to step 254, in which an attempt is made to read machine readable information.

If the checkout system 10 includes the scanner 50 built in accordance with the first embodiment of the invention, as described above in reference to FIG. 2, the process of attempting to read the machine readable information in step 254 includes turning on the laser 52 and monitoring the output signals from the output photodetector 80, the timing photodetector 82, and the emitter 84. The output signal from the output photodetector 80 is monitored to determine when machine readable information has been successfully read. The output signals from the timing photodetector 82 and the emitter 84 are monitored to determine which scan of the laser beam caused the machine readable information to be successfully read.

On the other hand, if the checkout system 10 includes the scanner 230, built in accordance with the second embodiment of the invention, as described above in reference to FIG. 7, the process of attempting to read the machine readable information includes processing data derived from the output signals of the video cameras 20 to determine if the data includes a representation of a valid machine readable information. For example, one or more of the methods described in U.S. Pat. Nos. 5,124,537, 5,155,343, 5,698,833, and 6,135,354, may be used to determine the presence and orientation of a valid machine readable information.

If this attempt is not successful, as determined in step 254, the system continues to attempt to read the machine readable information until a determination is made in step 258 that a time-out condition has been reached. A time-out condition may be reached by unsuccessfully attempting to read machine readable information for a period greater than a predetermined maximum time or, with the first embodiment scanner 50 of FIG. 2, rotating the scanning mirror to generate all possible scanning movements of the laser beam reflection for a predetermined number of times. When such a time-out condition is reached, an error condition is displayed in step 260. The display of such an error condition may include the illumination of a red indicator on the control panel 36. Alternately, the display of such an error condition may include a description of the error condition that has occurred, together with options than may be exercised on the display 130, which then must be located so that it is visible to the user of the scanner.

If it is determined in step 256 that the machine readable information has been successfully read, the system proceeds to step 262, in which the first field 204 of the data structure 200 (shown in FIG. 6) is examined to find a record 202 matching the item for which the machine readable information has just been read. Then, the shape of this item, together with the order in which data for dimensions is stored within the dimension fields 214, 216, and 218, is determined from data in the shape field 212, and the particular values of features to be checked are determined from the data stored in dimension fields 214, 216, and 218. Next, in step 264, the actual values of the item being scanned are determined, being evaluated on a basis provided by the data stored within the shape field 212 of the database.

If the checkout system 10 includes the scanner 50 built in accordance with the first embodiment of the invention, as described above in reference to FIG. 2, the location and orientation of the machine readable information is determined from the data describing which scan of the laser beam was occurring when the machine readable information was successfully read. Data derived from the output signals of cameras 20 can also be used, particularly to interpret the orientation of the machine readable information.

If the checkout system 10 includes the scanner 230 built in accordance with the second embodiment of the invention, as described above in reference to FIG. 7, the location and orientation of the machine readable information are determined entirely from data derived from the output signals of the cameras 20.

In either case, the location and orientation of the machine readable information is used, together with data from the shape field 214 to determine how features of the item being scanned should be evaluated and compared with data within the dimensional fields 214, 216, 218 of the record 202 corresponding to the barcode data which has been read. For example, if data in the shape field 212 indicates that the item should be a rectangular box, as described above in reference to FIG. 4, the length of an edge 173 extending parallel to the direction of the barcode edge 168 is determined to be the dimension that should be compared to the data in the first dimensional field 214. The length of the edge 174 extending perpendicular to the edge 168 of the barcode is determined to be the dimension that should be compared with the data in the second dimensional field 216. The length of the edges 178 extending away from the surface 174 on which the machine readable information is printed is determined to be the dimension to be compared with the data in the third dimensional field 218.

The lengths of various edges, or other predetermined values, are measured and determined from data derived from signals derived from the video cameras 20. For example, one or more of the techniques described in the referenced U.S. Pat. Nos. 4,654,872, 4,982,438, 5,638,461, and 6,445,814 may be used in this step.

Next, in step 266, a comparison is made between the measured values of features of the item being scanned and the corresponding values read from the data structure 200.

Preferably, only those values that can be determined for the item being scanned are used in this comparison, with values that cannot be determined due to the way the item is held being ignored. Allowable tolerances or ranges for these values may be applied uniformly, may be determined by means of an algorithm, or may be determined from values stored in additional fields of the data structure 200.

After the comparison of step 266 is completed, a determination is made in step 268 of whether the comparison has indicated a proper match between the item being scanned and the data stored within the data structure 200. If such a match is not indicated, an error condition is displayed in step 260, with the system then returning to step 252 to wait for another attempt to scan an item. From this point, the person using the scanner 12 can try to scan the item again, perhaps holding the item in a different way, or assistance from store personnel may be sought.

Referring additionally to FIG. 1, if it is determined in step 268 that a successful match has been made between the scanned item and the stored data, the system accepts the scanned item, for example, by allowing the item to be moved by the conveyor 18 to the collection area 14, in which scanned items are held for bagging. Thus, the system proceeds to step 270 to wait for the item to be placed in the entrance 24 to the secure area 16, causing the entrance detector 22 to produce an "on" indication that an item is present. When such an indication is provided, the conveyor 18 is started in step 272, moving the item toward the collection area 14.

When it is then determined in step 274 that the item has moved past the entrance detector 22, causing this detector 22 to produce an "off" indication, the system proceeds to a loop including step 276, in which a determination is made that the entrance detector 22 has again turned on, and step 278, in which a determination is made of whether the exit detector is turned "on." If an attempt is made to introduce a second item to the conveyor 18 before the item that has just been scanned is moved to the collection area the conveyer is driven in reverse, starting in step 279, to reject the second item, until it is determined in step 280 that the entrance detector has turned "off," indicating that the second items has been moved back from the conveyor 18. Then, in step 282, the conveyor 18 is started to again move the item that has just been scanned toward the collection area 14.

If there is no indication in step 276 that the entrance detector is turned "on," or if the conveyor 18 is again started in step 282 without another attempt to introduce a second item, the conveyor 18 runs until a determination is made in step 278 that the exit detector has turned "on" to indicate that the item is moving through the exit area 28 into the collection area 14, followed by a determination in step 284 that the exit detector has turned "off" to indicate that the item has been deposited within the collection area 14. Then, in step 286, the conveyor 18 is stopped, with the system returning to step 252 to wait for another attempt to scan an item.

While the use of the invention has been described within a checkout station 10, it is understood that the present invention may be used in other applications in which it is desirable to determine whether machine readable information on an item matches the item matches the item. For example, the present invention can be used to determine whether barcodes have been applied to the correct items.

While the machine readable information used in the invention has typically been described as a bar code pattern, it is understood that various other forms of machine readable information exist that could be used with the invention. For example, the machine readable information may alternately be alphanumeric characters printed in a font facilitating optical character recognition. Such characters are readily read from inputs such as video data. What is needed for use with the invention is machine readable information that is read to obtain a code found within the code field 204 of the data structure 200, with the machine readable information also being at a known location on the item.

While the invention has been described in its preferred forms or embodiments with some degree of particularity, it is understood that this description has been given only by way of example, and that numerous changes may be made without departing from the spirit and scope of the invention.

What is claimed is:

1. A checkout station comprising:
   a scanner reading machine readable information on an item being checked out to provide data for determining a value represented by said machine readable information, additionally providing data for determining a location of said machine readable information on said item being checked out, and additionally providing data for determining a measured dimension for each visible feature within a plurality of visible features of said item being checked out as said machine readable information is read;
   a conveyor extending between said scanner and a collection area;
   data storage including a data structure having a number of records, wherein each of said records includes a code field storing a value determined from machine readable information of an item corresponding to said record and a dimensional field storing an expected dimension for each of a plurality of visible features of said item corresponding to said record; and
   a microprocessor programmed to determine said value represented by said machine readable information from data received from said scanner, to find a corresponding record in a data structure within said data storage with a value in said code field corresponding to said value represented by said machine readable information, to compare measured dimensions of said plurality of visible features with expected dimensions of said plurality of visible features stored in said corresponding record, and to permit operation of said conveyor to move said item being checked out from said scanner to said collection area following a determination that said measured dimensions of visible features match various of said expected dimensions of visible features.

2. The checkout station of claim 1, wherein
   each record in a plurality of records within said data structure additionally includes a shape field storing a value defining an order of visible features for which dimensions are stored in said dimensional fields according to relationships between each of said visible features and a location of said machine readable information on said item corresponding to said record, and
   said microprocessor is programmed to read said shape code and to compare dimensions of visible features in said first and second pluralities according to said order of visible features defined by said shape code.

3. The checkout station of claim 2, wherein said order of visible features is additionally according to a relationship between one of said visible features and an orientation of said machine readable information on said item corresponding to said record.

4. The checkout station of claim 1, wherein said scanner includes:
   a laser;

a moving mirror causing a reflection of a beam produced by said laser to move across said item being checked out in a repeating pattern;

an output photodetector receiving a reflection of said laser beam from said object and producing an output signal; and a video camera viewing said item being checked out as said reflection of said beam moves across said item being checked out, and producing a signal providing said data for determining said measured dimension for each said visible feature.

5. The checkout station of claim 1, wherein said scanner includes:

a laser;

a moving mirror causing a reflection of a beam produced by said laser to move across said item being checked out in a repeating pattern;

an output photodetector receiving a reflection of said laser beam from said object and producing an output signal; and a plurality of video cameras viewing said item being checked out as said reflection of said beam moves across said item being checked out, and producing a plurality of signals together providing said data for determining said measured dimension for each said visible feature.

6. The checkout station of claim 5, wherein said scanner additionally includes a timing photodetector receiving said reflection of said beam produced by said laser as said reflection of said beam is moved through a portion of said repeating pattern and an emitter producing pulses with movement of said moving mirror, output signals from said timing photodetector and said emitter are used to provide an indication of a position of said moving mirror as said moving mirror is moved through said repeating pattern, and said location of said machine readable information is determined by a position of said moving mirror as said machine readable information is successfully read.

7. The checkout station of claim 5, wherein said scanner additionally includes an encoder producing an encoded pattern of pulses with movement of said moving mirror, said encoded pattern of pulses is used to provide an indication of a position of said moving mirror as said moving mirror is moved through said repeating pattern, and said location of said bar pattern is determined by a position of said moving mirror as said machine readable information is successfully read.

8. The checkout station of claim 5, wherein said output signals from said video cameras are additionally used to start said laser by determining that said object being checked out has been moved into proximity with said window.

9. The checkout station of claim 1, wherein said scanner includes a plurality of cameras simultaneously viewing said item being checked out, said cameras produce output signals used in combination for determining said value represented by said machine readable information, for determining said location of said machine readable information and for determining said measured dimension of each said visible feature.

10. The checkout station of claim 9, wherein said scanner includes a window, and said cameras are mounted in a spaced-apart relationship to view said item being checked out through said window.

11. The checkout station of claim 9, wherein said output signals from said cameras are additionally used to start a process of reading said machine readable information by determining that said object being checked out has been moved into proximity with said window.

12. The checkout station of claim 1, wherein said conveyor includes an entrance detector producing a signal when said item being checked out is placed within an entrance to said conveyor, and said microprocessor is additionally programmed to turn on said conveyor to move said item being checked out to said collection area in response to said signal from said entrance detector after determining that said measured dimensions match corresponding expected dimensions.

* * * * *